(12) United States Patent
van Niekerk et al.

(10) Patent No.: US 8,567,035 B2
(45) Date of Patent: Oct. 29, 2013

(54) METHOD OF LOOSELY PREFIXING AT LEAST TWO COMPONENTS THAT ARE TO BE FIRMLY CONNECTED WITH ONE ANOTHER

(75) Inventors: Johann van Niekerk, Munich (DE); Sonja Wolf, Munich (DE); Robert Donharl, Munich (DE); Klaus-Peter Sigl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 208 days.

(21) Appl. No.: 13/074,881

(22) Filed: Mar. 29, 2011

(65) Prior Publication Data

US 2011/0173797 A1    Jul. 21, 2011

Related U.S. Application Data

(63) Continuation of application No. PCT/EP2010/004746, filed on Aug. 3, 2010.

(30) Foreign Application Priority Data

Sep. 11, 2009  (DE) .......................... 10 2009 041 161
Oct. 16, 2009  (DE) .......................... 10 2009 049 602

(51) Int. Cl.
*B23P 11/00*         (2006.01)
(52) U.S. Cl.
USPC ....................................... 29/525.14
(58) Field of Classification Search
USPC .................. 29/428, 525.14, 418, 453, 897.2; 296/187.09, 193.03
See application file for complete search history.

(56) References Cited

U.S. PATENT DOCUMENTS 6,129,411 A     10/2000  Neff et al.
2004/0104599 A1  6/2004  Svendsen et al.

FOREIGN PATENT DOCUMENTS

| DE | 34 14 845 A1 | 6/1985 |
|---|---|---|
| DE | 197 41 062 A1 | 4/1999 |
| DE | 199 29 057 A1 | 12/2000 |
| DE | 698 00 282 T2 | 3/2001 |
| DE | 602 20 252 T2 | 1/2008 |
| DE | 10 2008 038 747 A1 | 2/2010 |

OTHER PUBLICATIONS

German Office Action dated Aug. 3, 2010 including English-language translation (Eight (8) pages).
International Search Report dated Dec. 22, 2010 including English-language translation (Four (4) pages).

*Primary Examiner* — John C Hong
(74) *Attorney, Agent, or Firm* — Crowell & Moring LLP

(57) ABSTRACT

A method of fixing, particularly loosely prefixing, at least two components that are to be firmly connected with one another, especially two body parts of a vehicle body that are to be firmly connected with one another, includes the steps of providing a first component on which at least one first form-locking element projecting from the first component is provided, providing a second component which has at least one second form-locking element that interacts with the first form-locking element of the first component, and loosely prefixing the two components by placing them together such that the form-locking elements interlock with one another. As a result, the components are held relative to one another at least in one direction. The at least one first form-locking element is a separate part that differs from the first component and that is connected with the first component only after the manufacture of the first component.

13 Claims, 1 Drawing Sheet

METHOD OF LOOSELY PREFIXING AT LEAST TWO COMPONENTS THAT ARE TO BE FIRMLY CONNECTED WITH ONE ANOTHER

CROSS-REFERENCE TO RELATED APPLICATIONS

This application is a continuation of PCT International Application No. PCT/EP2010/004746, filed Aug. 3, 2010, which claims priority under 35 U.S.C. §119 from German Patent Application Nos. DE 10 2009 041 161.5, filed Sep. 11, 2009, and DE 10 2009 049 602.5, filed Oct. 16, 2009, the entire disclosures of which are herein expressly incorporated by reference.

BACKGROUND AND SUMMARY OF THE INVENTION

The present invention relates to a method of loosely prefixing at least two components that are to be firmly connected with one another, especially two body parts of a vehicle body that are to be firmly connected with one another.

Such a method is known from an earlier German Patent Application DE 10 2008 038 747.9, which is not a prior publication.

In the large-series production of vehicle bodies, a plurality of individual body parts are assembled in a largely fully automatic manner. During a joining operation, two or more vehicle body parts are first positioned relative to one another by means of a high-expenditure chucking and receiving technique and are subsequently connected with one another, for example, by welding, clinching or other joining methods.

In order to ensure a high dimensional accuracy of the vehicle body, it is important that the vehicle body parts to be joined are positioned as precisely as possible relative to one another before the connection. In the case of conventional manufacturing systems, a vehicle body part to be joined is first precisely positioned with respect to the system or with respect to another component by use of mechanical chucking devices. The components to be joined will then be joined, for example, by being welded to one another. This method of positioning vehicle body parts to be joined can be called a "standard method" because it has been successful for many years. The dimensional accuracy of the vehicle body, on the one hand, depends on a positioning of the vehicle body parts to be joined that is as accurate as possible with respect to the "system" and, on the other hand, on how precisely the "system" (for example, the chucking device) brings the vehicle body part, that is to be joined and is positioned on it, into the joining position.

It is an object of the invention to provide a method of loosely prefixing at least two components to be firmly connected with one another, which method is easy to implement and, in a simple fashion, permits an exact alignment of the loosely prefixed components with a view to a subsequent joining operation.

This and other objects are achieved by a method of fixing, particularly of loosely prefixing, at least two components to be firmly connected with one another, particularly two body parts of a vehicle body to be firmly connected with one another or of fixing an add-on component or an (interior) fitting to a vehicle body component. The components consist of a first component on which at least one first form-locking element is provided, which projects from the first component, and of a second component which has a second form-locking element interacting with the first form-locking element of the first component.

By placing the two components together such that the form-locking elements interlock with one another and, as a result, hold the two components relative to one another at least in one direction, the two components are fixed or loosely prefixed.

In this context, the word "prefixing" means that the components are not permanently firmly connected with one another but can be separated from one another again without any problem. It may be provided that, by way of the mutually interlocking form-locking elements, the two components are fixed on the form-locking elements in a firm manner or with a certain amount of play in one, two or more directions in space relative to one another. In particular, it may be provided that, as a result of the two form-locking elements, the two components are displaceable relative to one another in one direction and, in the remaining directions in space, are firmly or almost firmly, with the exception of a predefined play, coupled to one another.

At least one first form-locking element is a separate part that differs from the first component and that is connected with the first component during or after the manufacturing of the first component.

In order to facilitate the mutual placing together and interlocking of the form-locking elements and to permit a moving of the form-locking elements relative to one another that is free of tilting, it is advantageous for the first form-locking element to be completely or partly rotationally symmetrical with respect to the normal surface line of the first component at the fastening point of the first form-locking element. Basically, for example, circular-cylindrical, truncated-cone-shaped or conical geometries are considered for the first form-locking element.

However, preferably first form-locking elements may be considered which completely or partly have the shape of a sphere or which completely or partly have a shape similar to a sphere. Similar to a sphere may mean, for example, that the shape is convexly curved, preferably rotationally symmetrically with respect to the direction of a normal line. Such "round or curved or convex geometries" simplify the "placing in one another" of the form-locking elements. A tilting of the form-locking elements is largely avoided by such a geometry when the two components are aligned relative one another.

According to a further aspect of the invention, the first form-locking element is designed such that it "tapers" at least in an area in the direction toward the first component, whereby an "undercut" is produced when the two components are placed together. This is particularly true in the case of a spherical form-locking element that is connected with the first component.

The first form-locking element can, for example, be screwed, riveted, glued or otherwise connected with the first component. Particularly a material-locking connection of the first form-locking element with the first component is also contemplated. The first form-locking element and the first component may each consist of metal. In this case, the first form-locking element can simply be welded onto the first component.

According to a further aspect of the invention, the second form-locking element is formed by a recess provided in the second component. This recess may have a slot-shaped design. Correspondingly, it may be provided that, in the loosely prefixed position of the two components, the first form-locking element reaches in a form-locking manner behind at least one area of the second form-locking element and, in a longitudinal direction of the second form-locking element or of the recess can be displaced relative thereto.

According to a still further aspect of the invention, the recess forming the second form-locking element is designed such that it has a first area that is dimensioned in such a manner that the first form-locking element can be fitted through it, and a second area directly adjoining the first area, which second area is narrower, so that the first form-locking element can be pushed into this area but cannot be pulled out perpendicularly thereto.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
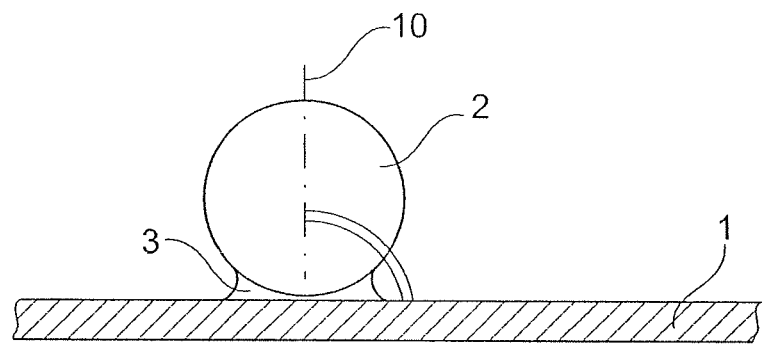
FIG. 1 is a schematic diagram of a first component and a first form-locking element.

FIG. 1 shows a first component 1 which is a metal plate that may consist, for example, of steel or aluminum. A sphere 2, which acts as a first form-locking element, is welded onto the first component 1. In its lower area, the sphere 2 is connected with the first component by way of a weld seam 3.

The dash-dotted axis of symmetry 10 indicates that the first "form-locking element 1" is rotationally symmetrical with respect to a normal surface line of the plate 1 at the "contact point", i.e. at the "point" or at the place, at which the sphere 2 is connected with the plate 1.

Figure 2:
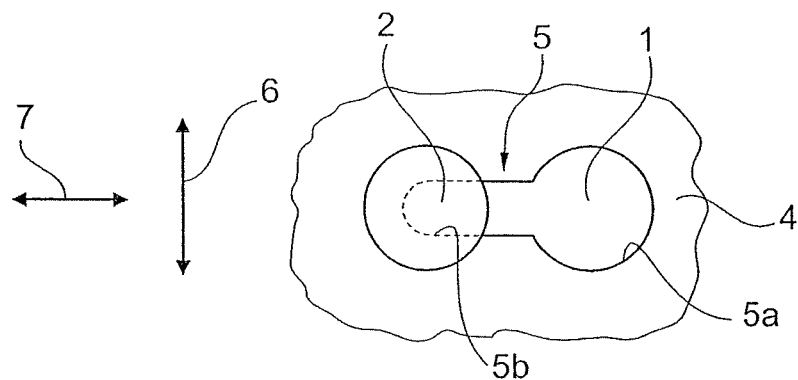
FIG. 2 is a top view of a component connection consisting of the first component, the first form-locking element, and a second component.

FIG. 2 is a top view of a component connection consisting of the first component 1, the sphere 2 welded onto the latter, and of a second component 4. The second component 4 may also be a metal plate.

A keyhole-type recess 5 is provided in the second component 4, which recess 5 has a first area 5a and a second area 5b which is partially covered here by the sphere 2 that is welded onto the first component 1.

Before the joining of the two components 1, 4, the sphere welded onto the first component 1 is first inserted through the first area 5a of the keyhole-type recess 5 provided in the second component 4. Subsequently, the components 1, 4 are displaced relative to one another, so that the sphere 2 reaches the position illustrated in FIG. 2. In the position illustrated in FIG. 2, the sphere 2 reaches over or extends behind the keyhole-type recess 5 in the area 5b. As a result, the two components 1, 4 are fixed relative to one another perpendicular to the plane of the drawing as well as also in a direction indicated by double arrow 6.

In this context, "fixed" means that the two components 1, 4 are fixed completely stationarily perpendicular to the plane of the drawing and in the direction of the double arrow 6 or at least that they are stationary with the exception of a predefined play; that is that they are "essentially" fixed.

However, in the transverse direction, i.e. in the direction of the double arrow 7, the two components 1, 4 can be displaced relative to one another. The two components 1, 4 are therefore only loosely prefixed by the "form-locking elements" 2, 5.

Before the two components 1, 4 are permanently firmly connected with one another, for example, by means of welding, they can still be precisely positioned relative to one another in the displacing direction 7.

A form-locking element that is welded onto the first component 1 and that has the shape of a sphere can very easily be inserted into a recess designed, for example, in the shape of a keyhole, without requiring tilting therein. As a result of the spherical shape, the first form-locking element "tapers" in the direction of the first component 1 (compare FIG. 1), which not only has the result that the sphere 2 reaches over or behind the area 5b of the recess 5 (compare FIG. 2) but also that the component 1 is also "centered" thereby in the direction of the double arrow 6 with respect to the component 4.

Figure 3:
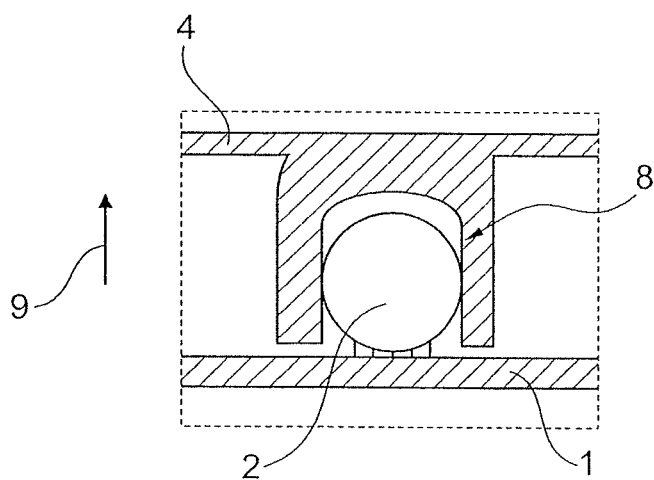
FIG. 3 is a schematic diagram of an embodiment in which the second form-locking element has a pot shape corresponding to an outside diameter of a first form-locking element.

FIG. 3 illustrates an embodiment in which the second form-locking element has the shape of a "pot" 8 whose inside diameter corresponds essentially to the outside diameter of the sphere 2 and which is "put in the inverted position" over the sphere 2. The pot-shaped form-locking element 8 may have a circular design so that, with the exception of the direction outlined by the arrow 9, the second component 4 is prefixed in all remaining directions in space with respect to the first component 1.

As an alternative, the pot-shaped second form-locking element may also have an oblong or oval design, so that the second component 4 can be additionally displaced relative to the first component 1 in a direction perpendicular to the plane of the drawing.

By way of the invention, two or more components can be prefixed relative to one another in a simple manner. In this context, "prefixing" means that the components are detachably connected with one another and, in certain directions in space, may even be mutually connected in a relatively displaceable manner. Such a prefixing considerably simplifies the precise alignment of the components with respect to one another, which is required before a permanently fixed connecting of the components occurs. The expenditures for chucking tools or similar devices are drastically reduced. In the case of component composites consisting of three or more components, it may even be provided that, as a result of placing the "last component" of such a component composite, essentially all components of the component composite are positioned precisely or already largely precisely relative to one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of loosely prefixing at least two components to be firmly connected with one another, the method comprising the acts of:

manufacturing a first component;

connecting with the first component in a material-locking manner, during or only after the manufacturing of the first component, at least one first form-locking element having a substantially spherical shape, the first form-locking element being a separate part that differs from the first component and is material-lockingly connected so as to project from the first component;

providing a second component having at least one second form-locking element operatively configured to interact with the first form-locking element of the first component; and loosely prefixing the first and second components by placing the first and second components together such that the first form-locking element and second form-locking element interlock with one another to hold the first and second components relative to one another at least in one direction.

2. The method according to claim 1, wherein the first form-locking element is at least partially rotationally symmetrical with respect to a normal surface line of the first component at a fastening point of the first form-locking element to the first component.

3. The method according to claim 1, wherein the first form-locking element tapers in a direction toward the first component at least in one area.

4. The method according to claim 2, wherein the first form-locking element tapers in a direction toward the first component at least in one area.

5. The method according to claim 1, wherein the first component is a metal plate.

6. The method according to claim 1, wherein the first form-locking element is made of metal.

7. The method according to claim 1, wherein the at least one first form-locking element is welded onto the first component.

8. The method according to claim 1, wherein the at least one second form-locking element is a recess provided in the second component.

9. The method according to claim 8, wherein the recess comprises a keyhole slot-shaped configuration.

10. The method according to claim 1, wherein the act of loosely prefixed the two components has the first form-locking element extending in a form-locking manner behind at least one area of the second form-locking element.

11. The method according to claim 8, wherein the recess is configured with a first area dimensioned for the first form-locking element to be inserted therethrough, and a second area directly adjoining the first area, the second area being dimensioned for the first form-locking element to extend in a form-locking manner behind the second area when the first form-locking element is located in the second area.

12. The method according to claim 1, wherein the act of loosely prefixing further comprises the act of:
   aligning the loosely prefixed components relative to one another in a precise manner corresponding to a predefined desired relative position; and
   further comprising the act of subsequently permanently connecting the first and second components together.

13. The method according to claim 1, wherein the first and second components are body parts of a vehicle body.

* * * * *